United States Patent Office 3,518,183
Patented June 30, 1970

3,518,183
PROCESS FOR SEPARATION OF OIL FILMS
FROM WATER
Anthony C. Evans, Redondo Beach, Calif., assignor to Shell Oil Company, New York, N.Y., a corporation of Delaware
No Drawing. Filed June 9, 1969, Ser. No. 831,728
Int. Cl. B01d 17/02
U.S. Cl. 210—40                    5 Claims

ABSTRACT OF THE DISCLOSURE

Hydrocarbon oil films may be removed from the surface of water by applying a large surface area of a block copolymer to the oil, absorbing the oil into the block copolymer, and separating the oil impregnated block copolymer from water.

---

This invention is concerned with the removal of oil slicks or spills from the surface of water, particularly sea water. More especially, it is directed to a process for such oil removal which not only is highly effective but also is non-toxic to marine life.

With the increasing transportation of oil by tankers throughout the waterways of the world and with the relatively recent increase in off-shore drilling operations, the problem of cleaning up oil spills or oil slicks from the surface of water and particularly of sea water has become of increasing concern not only from an economic aspect but also because of the marine biological impact of such oil spills either from the adverse effect of the oil itself or from the even more critically adverse effect of agents heretofore employed for removal or dispersal of oil slicks from water surfaces.

Furthermore, one of the problems encountered subsequent to removal of oil from the surface of water is the physical disposal of the large volumes of the oil involved. For example, in the recent oil spillage on the California coast, one of the methods of removing the oil was to spread straw along the beaches, and allow the oil to be adsorbed on the straw. However, the disposal of the oil-impregnated straw reached enormous proportions and it was found necessary to bury the tremendous quantities of oil-impregnated straw rather than resorting to burning thereof in view of the air contamination problem which would then have occurred.

The removal of oil slicks and oil spills is not confined only to marine disasters such as have occurred on the coast of California and the coast of Southern England but also is present on the rivers which are navigated by oil barges and the like. Furthermore, the separation of minor amounts of oil from water is highly desirable in cases where water is used for cooling purposes and the like such as in many industrial operations. If water can be readily separated from the oil then the water may be recycled for any number of desired times without contamination of the equipment by oil which may have come in contact therewith.

It is an object of the present invention to provide an improved process for the separation of hydrocarbon oils from the surface of water. It is a particular object of the invention to provide an improved process for oil separation which does not harm marine biological life. It is a further object of the invention to provide a process which does not entail a major subsequent disposal problem. Other objects will become apparent during the following detailed description of the invention.

Now, in accordance with the present invention, a process for the removal of hydrocarbon oils from the surface of water is provided which comprises applying to the oil a large surface area of certain block copolymers, absorbing oil into the block copolymer, and separating the oil impregnated copolymer from water. Still in accordance with the present invention, a particular aspect of the present invention comprises the application of a highly porous particulate form of the block copolymer to films of oil on the surface of water, particularly sea water, absorbing oil into the particles and removing the oil impregnated copolymer from the surface of the water.

The block copolymers especially useful in the operation of the subject process have the unique property of absorbing large quantities of oil while still retaining a high degree of their original stress-strain properties. Furthermore, the oil absorption is within the interior portions of the block copolymer rather than merely on the exterior surfaces thereof. Also, contrasted to the results obtained with other types of elastomers, the retention of a high degree of physical strength is especially noteworthy. Furthermore, in comparison with other types of elastomers, it has been found that within the scope of the present invention the oil impregnated block copolymers are relatively "dry" and do not exhibit the highly viscous, sticky, characteristics noted with many other oil impregnated polymeric substances.

One of the aspects of the present invention comprises the ease with which hydrocarbon oils are absorbed into block copolymers aided especially by the natural wave and the tide action occurring at all times on the surface of bodies of water and particularly on the surfaces of oceans and the like. Thus it is indicated that the use of the present process is especially efficient for serious oil spills.

The block copolymers particularly contemplated for use in the present process comprise block copolymers of monovinyl arenes and conjugated dienes having at least two non-elastomeric monovinyl arene polymer blocks polymer separated by a conjugated diene polymer block, as well as hydrogenated derivatives of these block polymers. The general structure of the block molecules may be expressed by two general formulae, namely $A\text{-}(B\text{---}A)_{1-5}$ and $A\text{---}B\text{-}(B\text{---}A)_{1-5}$. In these general formulae each A represents a monovinyl arene polymer block preferably having an average molecular weight between about 7,500 and 45,000, while each B represents an elastomeric conjugated diene polymer block preferably having an average molecular weight between about 45,000 and 150,000. The above general formulae allow for linear block copolymers in the first formula and for branched block copolymers according to the second formula. The monovinyl arene polymer blocks are non-elastomeric in character, i.e., have glass transition temperatures above 25° C., and may comprise either homopolymer or copolymer blocks as long as they are nonelastomeric and generally predominate in a monovinyl arene as major polymerizable unit. The conjugated diene polymer blocks on the other hand have reduced compatibility with the monovinyl arene blocks and may be either homopolymeric or copolymeric, the essential characteristic being that they be of such constitution that they are characterized by elastomeric properties, i.e., have glass transition temperatures below about 10° C.

The most simple configuration meeting all of these criteria is of a three-block copolymer A–B–A wherein the blocks A comprise non-elastomeric monovinyl arene polymer blocks and B comprises a conjugated diene elastomeric polymer block. The above formulae contemplate also the representation of the blocks A and/or B which may be partially or completely hydrogenated. If the hydrogenation is carried to only a partial extent, it is preferred that the blocks B, namely, the conjugated diene polymer blocks be hydrogenated so as to reduce their oxidation sensitivity. Thus the polymers may comprise polymer blocks which are not hydrogenated, which are partially hydrogenated, or which are fully hydrogenated.

The monovinyl arenes which may be employed include especially styrene, alpha methyl styrene, and ring alkylated styrene. These may be copolymerized with one another or with a conjugated diene to form the blocks A. The conjugated dienes which may be utilized in the formation of especially of the blocks B or as minor components in the blocks A include particularly conjugated dienes having from 4 to 8 carbon atoms per molecule, especially butadiene and isoprene. Suitable block copolymers have the configuration polystyrene-polybutadiene-polystyrene and polystyrene-polyisoprene - polystyrene. The use of other copolymerizable monomers may be indicated dependent primarily upon the end use of the oil-block copolymer in its final disposition. In fact, this may be the controlling factor in the selection of the particular block copolymer particularly with respect to whether or not the block copolymer is to be a hydrogenated species.

The synthesis of the subject classes of block copolymers does not form a part of the present invention and is disclosed in the patent and technical literature. Briefly, however, the synthesis normally entails the use of a lithium based initiator which may be either monofunctional or polyfunctional as desired. The blocks of the copolymer may be formed sequentially or the polymer chains may be formed by a combination of a sequential process with the use of a coupling agent. The coupling agents employed, such as dihaloalkanes or esters formed between monohydric alcohols and polycarboxylic acids, especially dicarboxylic acids, may result in either linear or branched configuration as desired. Typical lithium based initiators include lithium alkyls such as secondary butyl lithium or dilithio alpha methyl styrene adducts. Hydrogenation of the block copolymers may be either non-selective so as to hydrogenate both the monovinyl arene polymer blocks as well as the conjugated diene blocks or may involve conditions and catalyst which are capable of promoting selective hydrogenation of the conjugated diene polymer blocks to the partial or complete exclusion of hydrogenation of the monovinyl arene polymer blocks. Suitable catalysts include the reaction products of aluminum alkyl compounds with nickel or cobalt carboxylates or alkoxides. Typical hydrogenated derivatives of the basic block copolymers include polystyrene-ethylene propylene copolymer-polystyrene and polyvinylcyclohexane-ethylene propylene copolymer-polyvinylcyclohexane.

The physical form of the block copolymers is important with respect to their efficiency of oil absorption. Generally it can be stated that a large surface area is highly desirable. By large surface area is meant a block polymer subdivided to such an extent that it presents a large surface to the oil films which they are supposed to absorb. This may be accomplished by numerous means but preferably by some form of a porous particle or comminuted, granulated or screened structure.

The particles may be formed, for example, by creating a foam of the rubber and then shredding the foam to form highly porous particles of the block copolymer. On the other hand, the porous particles may be formed by coagulation of the block copolymer from a cement thereof into water by means of a high enthalpy steam jet. This causes shock evaporation or flashing of the solvent present in the cement and results in the formation of "crumb" which with proper handling will be a porous particle. This is aided, for example, by both the use of high enthalpy steam, high temperature (super-heated) but liquid water for the coagulating bath and by a high degree of agitation of the bath. Preferably, particles of the block polymers are subdivided so as to pass a 10 mm. screen, and still more preferably at least about 75% by weight of the particles should pass a 4 mm. screen.

On the other hand, for special purposes, such as in separators and the like, mats of fibers of the block polymer or relatively thin mats of block copolymer foam may be utilized. Furthermore, the polymers may be entrapped in other inert material or confined within wire nets or other suitable arrangements dependent upon the mechanical details of the oil collecting process being employed.

The process of the invention comprises the spreading of the finely divided block copolymer on the oil slick which normally would be situated at the surface of a body of water. This may be done by blowing the particles in the direction desired if this is the first step contemplated. On the other hand, confined or shaped porous bodies of the block copolymer may be used to surround or control an area of water where an oil slick is present or expected. For example, a collar surrounding an offshore drilling platform may be provided which comprises a tubular net filled with porous block polymer foam or shredded foam or other high surface areas such as particles of the block polymer. Thus the collar so placed forms a potential barrier for any oil which may be emitted from the off-shore drilling zone. Similar arrangements may be used in the form of booms or dikes to stop the invasion of oil slick into the mouths of harbors or along sections of coast line.

The amount of block copolymer utilized will depend in part upon the thickness of the oil film to be absorbed, the time needed for economic collection of the oil, the agitation of the body of water from which the oil is to be removed, and similar physical factors. When the oil slicks comprise film from 0.001 to 0.5 inch in thickness, it is preferred that the finely divided block copolymer be applied in an amount between about 3 and 7 pounds per gallon of oil. The time required for absorption of the oil into the high surface of the block copolymer will vary with the temperature, the degree of agitation, the ratio of oil to block polymer, the viscosity of the oil, and the surface area of the block polymer being utilized. Normally the time required for substantially complete absorption of the oil into the block copolymer will be between 1 hour and 3 days, normally between about 2 and 8 hours. The oils particularly considered here comprise crude oil, fuel oil such as normally utilized in the marine engines and the like as well as other oil products including kerosene, gasoline, furnace oil, etc.

One of the surprising features of the process of this invention comprises the virtually complete absorption of the oil within the body of the block copolymer leaving the surface of the oil impregnated block polymer essentially "dry." This facilitates and enables the collection of the oil impregnated block polymer by such means as raking, movement of a boom or net across the surface of the water and the like. The presence of the oil in the structure of the block copolymer enables the original particles to coalesce at the surface into a more or less firmly bound structure, again facilitating recovery of the oil impregnated polymer from the surface of the water.

The process of the present invention is especially effective and rapid when the proportions of oil and polymer are about equal. The oil-soaked polymer composition may be readily collected and economically utilized in a subsequent operation. For example, it has been found that the block polymers as well as the oil can be dispersed in all proportions in asphalts as compared with the limited miscibility of other types of rubber. Consequently, it is both possible and practical to combine the collected oil-impregnated block polymer with asphalt and utilize the compositions so formed in the preparation of roads, slabs, dikes, canal linings and the like. This is especially suitable when the oil being absorbed by the block copolymer is a relatively non-volatile oil or fraction thereof.

A series of evaluations of a number of polymeric products were undertaken using Ventura crude oil floating on sea water in vessels provided with light agitation to simulate the action of waves and the like. These evaluations, while qualitative in nature, provided clear comparative results. An arbitrary grading system was set up for the effectiveness of an additive in removing the oil from sea water. The scale utilized ranged from 0 (totally ineffective) to 10 (highly effective).

0—The additive dissolves in crude oil and creates a viscous, sticky liquid which resembles tar and would probably be worse to handle than the crude oil.
2—No apparent effect, both additive and water coated with crude oil.
4—Majority of crude oil is in a free coating on the additive; very little free oil on the water. No apparent absorption into the additive and if disturbed the oil flows from one surface to another.
6—Approximately one-half of the oil is absorbed into the additive, the remainder being a free coating on both the additive and the water.
8—The majority of the oil is absorbed into the additive, the remainder being a thin coating on the surface of additive and a very thin coating on the surface of the water.
10—The crude oil has been totally absorbed by the additive. The additive has agglomerated into lumps and neither it nor the water has a free surface coating of oil. The agglomerated lumps are "dry" of oil and are non-sticky.

The following table describes the influence of oil thickness and ratio of polymer to crude oil when using a chopped crumb, 100% of which passed through a 4 millimeter screen. The block copolymer employed for this purpose had the general structure polystyrene-polyisoprene-polystyrene, the block molecular weights being 10,000–150,000–10,000.

At a concentration of one part of polymer to one part of crude, total absorption of the oil by the chopped polymer took place within about 3 hours. For a given period of time and polymer to oil ratio, the effectiveness of the polymer decreases with decrease in oil film thickness. From observation of the samples and from the results listed in the following table, it was readily apparent that this was a function of the surface area of the polymer available for contact with the oil. For a constant ratio of polymer to crude oil, a decrease in the volume of oil did not result in a reduction in area of the oil film, only a reduction in its thickness. However, it did result in a proportional decrease in the surface area of the block copolymer available for absorption. The area of contact, and hence, the rate of absorption of the oil was reduced. As a corollary, for a given polymer to oil ratio, a longer period of time is required to achieve the same degree of effectiveness with the thinner film.

TABLE I

[The influences of oil thickness and ratio of polymer to oil on the absorption of Ventura crude by chopped (100% through 4 mm. screen) block copolymer]

| Oil film thickness | Ratio of polymer to oil | Contact period | | |
|---|---|---|---|---|
| | | 1 hr. | 3 hrs. | 24 hrs. |
| 0.005" | 1 to 1 | 8 | 10 | 10 |
| 0.005" | 1 to 2 | 5 | 6 | 8 |
| 0.005" | 1 to 4 | 5 | 5 | 5 |
| 0.010" | 1 to 1 | 9 | 10 | 10 |
| 0.010" | 1 to 2 | 6 | 8 | 8 |
| 0.010" | 1 to 4 | 5 | 5 | 6 |
| 0.020" | 1 to 1 | 10 | 10 | 10 |
| 0.020" | ¹1 to 1 | 5 | 6 | 8 |
| 0.020" | 1 to 2 | 6 | 8 | 9 |
| 0.020" | 1 to 4 | 5 | 5 | 6 |
| 0.040" | ¹1 to 2 | 6 | 7 | 8 |
| 0.250" | 1 to 1 | 10 | | 10 |
| 0.250" | ¹1 to 1 | 8 | | 10 |

¹ Normal crumb size.

After 24 hours, the floating agglomerated solids of the oil impregnated polymer were removed from the surface of the water leaving it completely free from oil. These solids were not sticky, were "dry" of oil and could be handled without the transfer of oil on to another surface. The oil had been totally internally absorbed and there was no free surface coating of oil which could be washed off by subsequent wave action, handling by nets or scoops, or abrasion on rocks or beaches.

The table also shows a difference between the effectiveness of the normal size crumb (½ to ¾ inch) and that of the chopped crumb over a relatively short period of time. The data for the quarter inch thick oil slick indicates that although there is no apparent difference in the capacity for absorption, the rate of absorption by the larger crumb is less than that for the chopped, smaller particle sized crumb. It is apparent that, although for thick slicks the larger sized crumb should be an effective controlling additive, for oil slicks less than one quarter inch thick it is advisable to increase the specific surface by chopping, grinding, foam, etc. in order to achieve adequate contact with the oil and hence good effectiveness of absorption.

The effectiveness of absorption of crude oil by other polymeric products is given in the table below. These polymers were rated against the block copolymer used in the previous comparative tests and, where necessary, each was cut into pieces of approximately the same size as the block copolymer crumb. An oil film thickness of 0.02 inch was employed, the polymer to oil ratio being 1:1. The polyisoprene and SBR (random styrene-butadiene copolymer) slowly dissolved in the oil, yielding a thick viscous sticky liquid resembling tar.

TABLE II.—A COMPARISON OF THE EFFECTIVENESS OF SELECTED POLYMERS AT ABSORBING VENTURA CRUDE OIL

| Polymer | Contact period | | | |
|---|---|---|---|---|
| | 1 hr. | 3 hrs. | 24 hrs. | 48 hrs. |
| Block polymer | 5 | 6 | 8 | 9 |
| Polyisoprene | 3 | 2 | 1 | 0 |
| SBR rubber | 3 | 2 | 1 | 0 |
| Foamed polystyrene | 4 | 4 | 4 | 4 |
| Foamed polyisoprene | 4 | 4 | 4 | 3 |
| Foamed SBR | 4 | 4 | 4 | 3 |

From the above results, it can be concluded that the tremendous affinity for oil and retention of physical strength represents a unique property of the block copolymers which provides effective means of controlling oil slicks and spills by a total absorption of the oil into the copolymer. Unvulcanized ordinary rubbers, such as polyisoprene or SBR have an affinity for oil but, due to their high molecular weight, the rate of absorption is slow and, due to their non-vulcanized state, they do not retain any strength but slowly dissolved in the oil.

Vulcanized rubber, on the other hand, is softened by and slightly swollen by oil but does not have sufficient affinity for oil. Due to the unique molecular configuration and relatively low molecular weigth of the block copolymers. The latter can absorb oil rapidly and still retain good tensile strength. From observations of the foamed polymer it is apparent that the rate of absorption would be dependent upon contact with oil and hence available surface area.

I claim as my invention:

1. The process for the removal of hydrocarbon oil films from the surface of water which comprises
    (a) applying to said film finely divided block copolymer of the group consisting of
        (1) block copolymer of monovinyl arenes and conjugated dienes having at least two non-elastomeric monovinyl arene polymer blocks separated by a conjugated diene polymer block; and
        (2) hydrogenated derivatives of the same;
    (b) absorbing oil into said block copolymer; and
    (c) separating the oil impregnated block copolymer from the water.

2. A process according to claim 1 wherein the block polymer comprises porous particles having an average particle size diameter less than about 10 mm.

3. A process according to claim 1 wherein the block copolymer has the general configuration $$A-B(B-A)_{1-5}$$

wherein each A is a monovinyl arene polymer block having an average molecular weight between about 7,500 and 45,000 and each B is a conjugated diene polymer block having an average molecular weight between about 40,000 and 150,000.

4. A process according to claim 2 wherein the particles comprise shredded block polymer foam.

5. A process according to claim 1 wherein the block copolymer is applied in an amount between about 3 and 7 pounds per gallon of oil.

References Cited

UNITED STATES PATENTS

| 3,147,216 | 1/1964 | Oemler | 210—40 |
| 3,215,623 | 11/1965 | Hix | 210—24 |
| 3,334,042 | 8/1967 | Teitsma | 210—24 X |
| 3,441,530 | 4/1969 | Bauer et al. | 260—880 |

SAMIH N. ZAHARNA, Primary Examiner

U.S. Cl. X.R.

210—502; 260—880